April 9, 1929.  A. GUIGNARD  1,708,364
MACHINE FOR STERILIZING AND WASHING FRUIT
Filed June 1, 1927  2 Sheets-Sheet 1
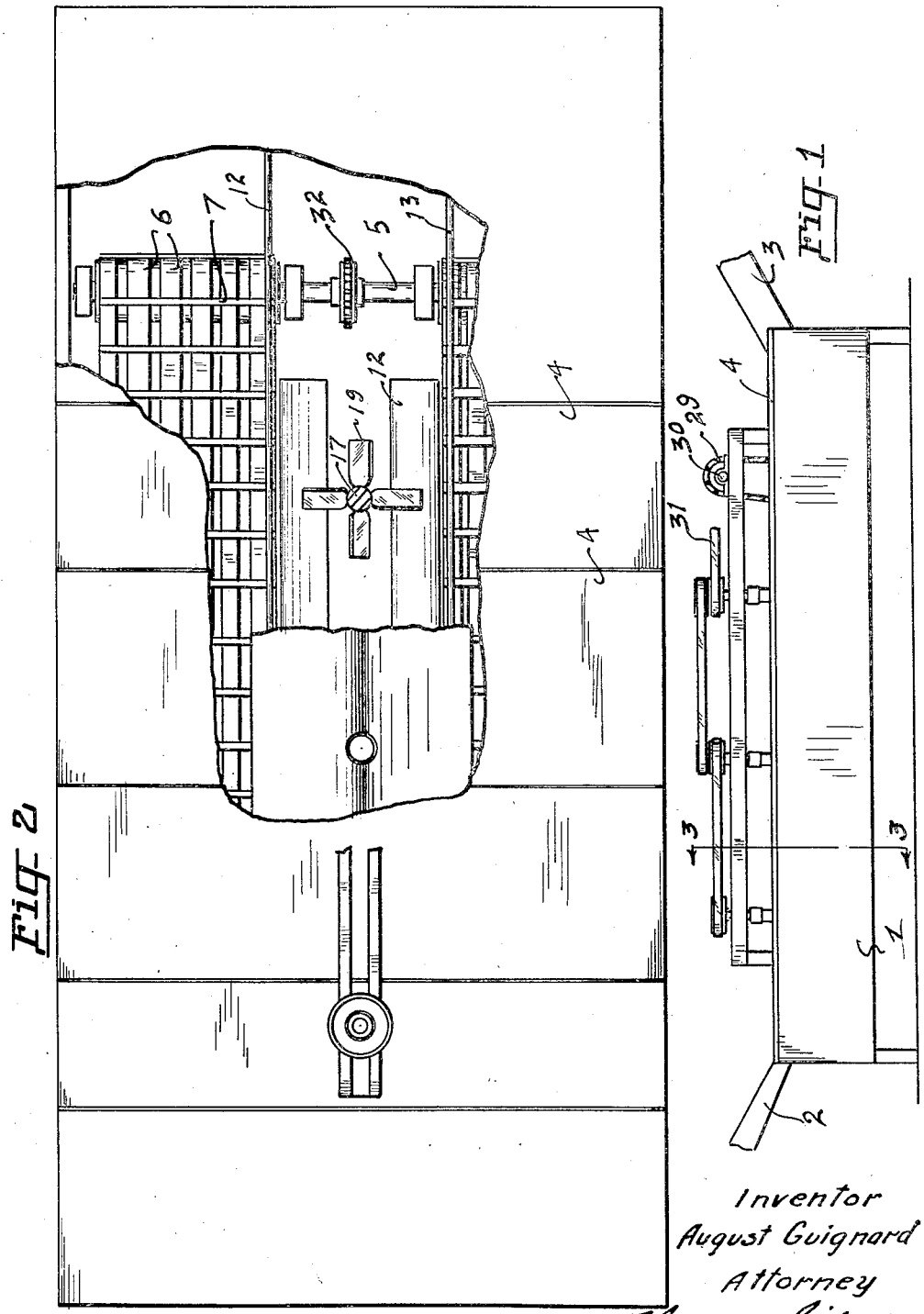
Inventor
August Guignard
Attorney

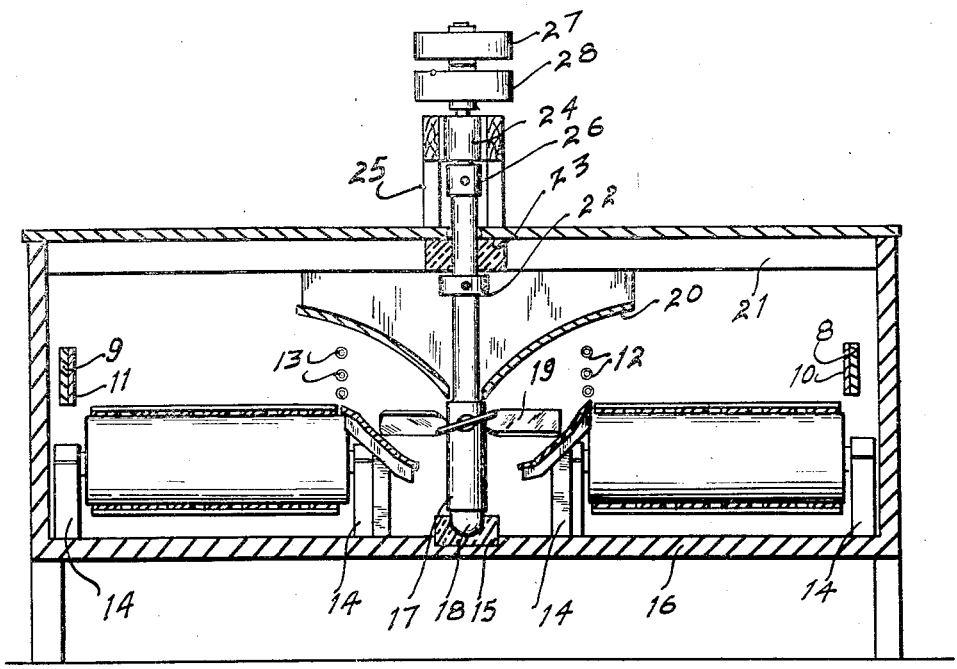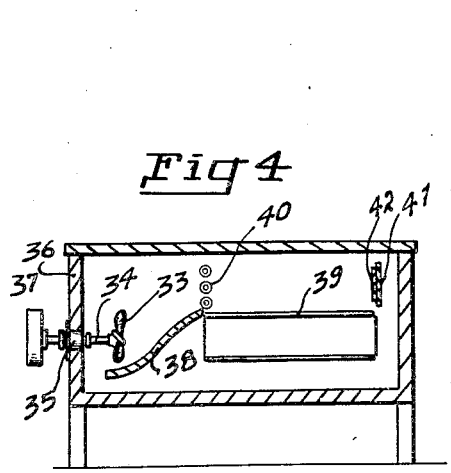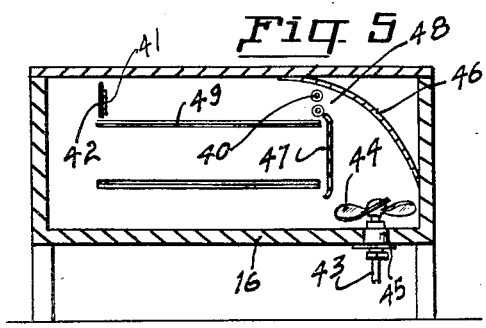

Patented Apr. 9, 1929.

1,708,364

UNITED STATES PATENT OFFICE.

AUGUST GUIGNARD, OF HOOD RIVER, OREGON.

MACHINE FOR STERILIZING AND WASHING FRUIT.

Application filed June 1, 1927. Serial No. 195,784.

My present invention relates to my pending United States patent application filed in the United States Patent Office, on or about the 17th day of May, 1927, for a machine for sterilizing, washing and drying fruit.

My present invention consists primarily of means for the circulating and flushing of the treating solutions over, around and about the fruit being passed through the vat or tank into which the treating solutions are held.

A further object of my invention consists in providing simple, efficient and economical elements for the treating of fruits in commercial quantities.

Acids and other deteriorating agents are utilized in the treating solutions and it is therefore necessary and expedient in so far as possible to make the vats and the elements disposed therein of noncorrosive material. Wood and rubber are two of the cheaper of these elements and it is highly desirable to utilize these materials to a large extent.

Where metals are used, the precious or semi-precious metals that are acid resistants, are required and it was therefore necessary to depart from their use as far as possible to lessen the expense and deterioration of the device as a whole.

I have therefore here illustrated, described and claimed a device that may be made almost entirely of wood, wood products, and of rubber or rubber covered elements.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Fig. 1 is a side elevation of a preferred embodiment of one of my assembled devices.

Fig. 2 is a top, plan view, partially in section, of the mechanism illustrated in Fig. 1.

Fig. 3 is a vertical, cross section view, taken on line 3—3 of Fig. 1, looking in the direction indicated.

Fig. 4 is a sectional view of another embodiment which is made to illustrate a simple and efficient means of flushing the treating solutions over the conveyor and the materials being carried thereupon.

Fig. 5 is still another form of embodiment of a circulating device for flushing the treating solutions upon and over the conveyor and the fruits being transported thereupon and thereacross.

Like reference characters refer to like parts throughout the several views.

1 is a treating solution tank having an input chute 2, disposed upon the forward end of the same and an outlet elevator 3, disposed upon the opposite end of the solution tank. A top 4, preferably made in section, is disposed upon the vat or tank to form a closure therefor. In my present application I have a multiple of cross shafts 5, one of which is the driving shaft about which operate endless conveyor belts preferably made of a series of belts 6, having cross slats 7. The belts are in spaced relationship to permit of an over flowing of the treating solutions therethrough. In a preferred embodiment of which Fig. 3 is a cross section view, I run a conveyor at each side of the vat and have disposed adjacent each side, side rails 8 and 9, the inner side of which are shown at 10 and 11, are preferably made of rubber covered material, as rubber belting with a space between the side rail and the conveyor belt. Rubber covered roping, illustrated at 12 and 13, are disposed parallel the inner side of the conveyor to permit of the over flowing of the treating solutions therebetween and upon the fruit products to be treated being conveyed upon the conveyor belt longitudinally of the vat. Stands 14 are disposed within the vat and drums, are secured to the shafts about which the conveyor belts are carried. I place an end bearing 15, within the base 16, of the vat and secured thereto a vertical propeller shaft 17, having an end bearing 18, disposed at its lower end and adapted to engage within a suitable bearing journal within bearing block 15. Outwardly projecting propelling blades 19 are disposed about the vertical shaft 17, and are made of proper pitch and height to pick up the solutions and distribute the same through the ropes 12 and 13 and cause the same to flow, in an agitated manner, over and upon the conveyor belts and the fruit products being carried thereby. A curved shield or deflector 20 is secured to upper cross bars 21 of the vat to prevent the upward flowing of the materials and to cause the materials to flow in an even stream like manner upon the conveyor belts. A collar 22 is disposed upon the vertical shaft 17 and abuts the underside of the block 23, this is to prevent of a raising of the shaft and propeller when the same is in operation. A journal block 23 is placed upon the cross bars 21, through which the vertical shaft passes. A second journal bearing 24 is disposed at the upper end of the supporting brackets 25 and a second collar 26 is disposed upon the shaft and engages the under side of the journal bearing 24. Driving and driven pulleys 27 and 28 are disposed at the upper end of the shaft. I have here shown, in assembly detail in Fig. 1, three of these vertical shafts and driving elements for imparting rotation thereto but I do not wish to be limited to any specific number as the character of mechanism required where fairly large amounts of fruit products are to be treated. Smaller devices may be made, as illustrated in Fig. 4 wherein a propeller 33 may be disposed upon a horizontal shaft 34, and the same be made to pass through a stuffing box 35, disposed through the side wall 36 of the tank. Power of rotation being imparted to the driving pulley 37 through a source of power, not here shown. A shield 38 is disposed within the tank to facilitate the upward flowing of the agitated material and the deposit of the same upon the conveyor 39. A rubber covered roping side wall 40 is disposed upon the inner side of the conveyor through which the agitated treating fluids are to be pumped or made to flow and the oppositely disposed rail 41 runs, parallel to, and forms a side wall for the conveyor 39 to prevent the fruit being passed therealong from becoming disengaged from the conveyor. A rubber covered side wall 42 is disposed upon the inner side of the side rail 41. Equally satisfactory results may also be obtained as shown in Fig. 5 wherein the vertical shaft 43 is disposed through the bottom of the vat or tank 16, as illustrated in Fig. 5, and wherein the treating solutions are caused to flow upward through the action of the propeller 44 disposed upon the inner end of the shaft 43. A stuffing box 45 being provided through the bottom wall 16 of the tank. A shield 46 causes the fluids being agitated to flow between the shield 46 and the shield 47 through the channel 48 and to be distributed over the materials being carried upon the conveyor 49.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a liquid holding vat, treating solutions disposed within the vat, an endless conveyor disposed longitudinally of each side of the vat, one or more shafts vertically disposed between the endless conveyors, propeller blades outwardly extending from each of the vertical shafts, cooperating elements for driving each of the shafts and each of the conveyors and means for causing the solutions being agitated for flowing over the conveyors and the products being carried thereby.

2. In a device of the class described, the combination of a liquid holding vat, a multiple of endless conveyors disposed within the vat, means for driving each conveyor, a vertical shaft maintained within journal bearings disposed within the tank, a circulating propeller disposed upon the lower end of the shaft, means for driving the shaft and the propeller and curved deflectors disposed above the propeller adapted for deflecting the liquid, as circulated by the propeller, over the upper surface of the endless conveyors.

3. In a device of the class described, a liquid holding tank, a pair of conveyors running from end to end thereof, vertical shafts each provided with a propeller submerged in said liquid, a shield spaced above said propellers, said shield presenting two oppositely inclined curved surfaces adapted for deflecting the liquid forced upwardly by said propellers over the aforesaid conveyors.

4. In a device of the class described, a liquid holding tank, means within said tank for moving fruit or the like from one end thereof to the other, means for causing a current in the liquid within said tank, and a deflector cooperating with the last mentioned means adapted for deflecting the liquid current upward and over the aforesaid fruit conveying means.

AUGUST GUIGNARD.